Sept. 15, 1959 M. E. BLECK 2,904,286
LEG RETRACTION AND RESTRAINING DEVICE
FOR AIRCRAFT EJECTION SEAT
Filed March 12, 1956 2 Sheets-Sheet 1

INVENTOR.
MAX E. BLECK
BY
ATTORNEY

Sept. 15, 1959　　　　　　　　M. E. BLECK　　　　　　　　2,904,286
LEG RETRACTION AND RESTRAINING DEVICE
FOR AIRCRAFT EJECTION SEAT
Filed March 12, 1956　　　　　　　　　　　　　　　　2 Sheets-Sheet 2

INVENTOR.
MAX E. BLECK
BY
ATTORNEY

United States Patent Office 2,904,286
Patented Sept. 15, 1959

2,904,286

LEG RETRACTION AND RESTRAINING DEVICE FOR AIRCRAFT EJECTION SEAT

Max E. Bleck, Littleton, Colo., assignor to Stanley Aviation Corporation, Buffalo, N.Y., a corporation of New York Application March 12, 1956, Serial No. 570,882

7 Claims. (Cl. 244—122)

This invention relates to safety devices for use with the emergency escape equipment of modern aircraft; and more particularly, to an emergency leg retraction device which will hold a crewman's legs in safe position while being ejected from the aircraft.

An emergency escape from today's military aircraft frequently takes place at a flying speed of many hundred miles per hour where split-second reactions on the part of the crewmen are required if the escape is to be safely made. It is well known, however, that a human being cannot be relied upon to function properly under conditions of great physical and emotional strain such as are experienced when it is necessary to bail out of a disabled aircraft. Therefore, the number and complexity of physical operations which must be performed by the crewman to accomplish his escape from the plane have been reduced in some instances to one simple movement which certainly approaches the optimum condition.

With this one manual operation, a number and variety of complex automatic operations are initiated which eject the crewman from the disabled plane and protect him from injury. It is one of these operations that forms the subject matter of the present invention.

During normal flight conditions the pilot's feet are extended forwardly on the controls. If the pilot were ejected from the plane with his feet and legs extended, however, he would suffer serious injury, as the hatch or canopy opening in the fuselage is of insufficient size to pass his body in this position. It would seem to be a simple matter for the pilot to retract his limbs into a safe position for ejection; however, as has already been mentioned, the pilot cannot be relied upon to perform even this operation under the mental and emotional strain that certainly accompanies an emergency escape. Also, there is no assurance that the pilot will not be injured or nearly unconscious, which would render him physically unable to take these precautions. Furthermore, once the pilot has left the plane he is subjected to tremendous physical shocks and forces due to the airblast which necessitates the use of safety devices which supplement his own efforts at self-protection.

It is, therefore, the principal object of the present invention to provide a leg retraction device initiated by a single manual operation which will place the feet and legs of a crewman in safe position for ejection and maintain them in this position until it becomes necessary to separate from the ejection seat.

A second object is to provide a leg retention device which will resist all forces applied to the limbs of the crewman that would tend to dislodge them from a safe position, except a force applied in a direction to separate from the seat, which can only be applied after the automatic lap belt has opened following ejection.

Another object of the invention is to provide a leg restraining device which will move the feet into safe position regardless of their position prior to ejection.

Further objects of the invention are to provide leg restraining means which are simple, lightweight, compact and universally adaptable to different crewmen.

Other objects will be in part apparent and in part pointed out specifically hereinafter in connection with the description of the drawing which follows, and in which.

Figure 1:
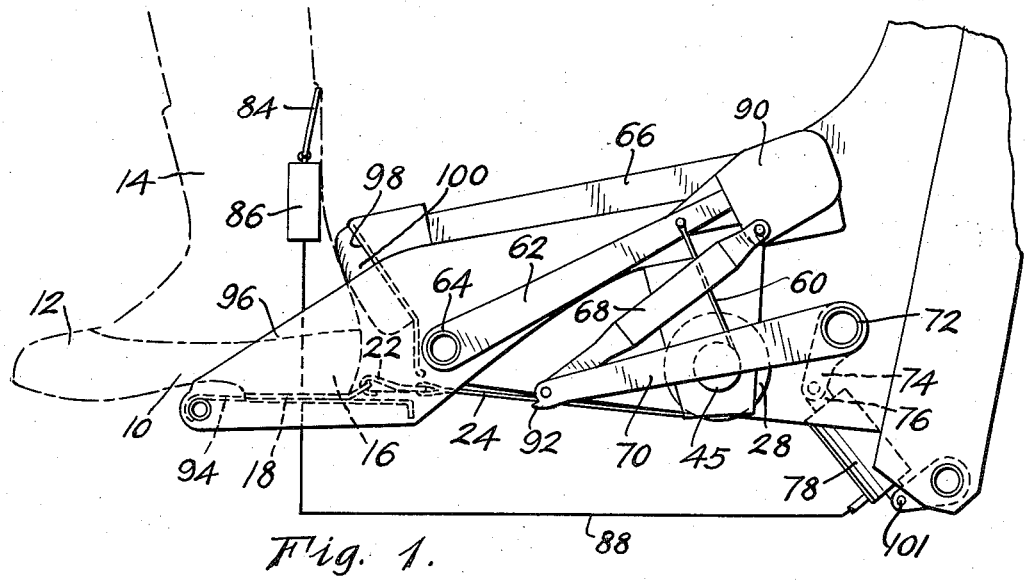
Figure 1 is a side elevation showing the leg retraction device of the present invention in its normal or unactuated position in which the feet of the seat occupant are substantially without restraint.
Figure 2:
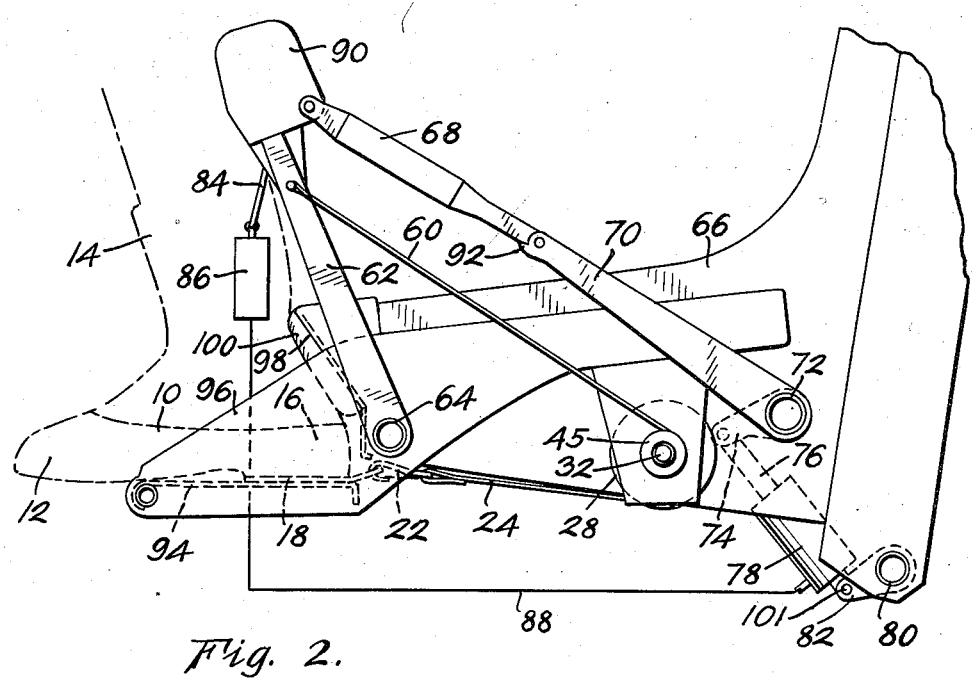
Figure 2 is a side elevation similar to Figure 1 showing the leg retraction device in actuated position wherein the feet are restrained and held against the front of the ejection seat.

Referring now to the drawing, Figure 1 shows the leg retraction device of the present invention in its pre-operative or unactuated position; whereas, Figure 2 illustrates the device in fully actuated position. As will be clearly seen in Figures 1, 2 and 3, a rubber slipper 10 is provided for each foot of the seat occupant. Each slipper contains a toe-receiving pocket 12 sized to receive the toe portion of a flying boot 14 indicated by dotted lines. In the particular construction illustrated, the heel 16 of the slipper is provided with a plate 18 permanently attached thereto and containing an opening 20, shown in Figure 3, for the reception of a fastener 22 forming a detachable connection therebetween.

Figure 5:
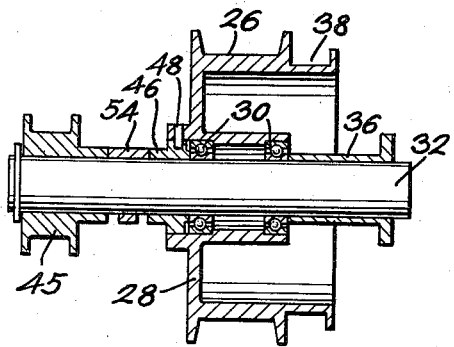
Figure 5 is a section taken along line 5—5 of Figure 4.
Figure 6:
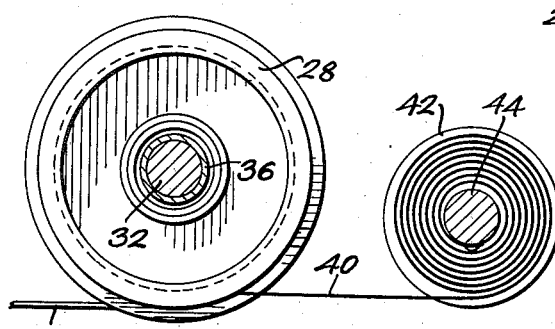
Figure 6 is a section taken along line 6—6 of Figure 3.

The fasteners 22 are carried on the ends of straps 24, or the like, i.e., cables, metal straps, etc., which are wound on, and attached within, grooves 26 of a first pair of reels 28. In Figure 5 it will be seen that the reels 28 of the first pair of reels are mounted for free rotation on bearings 30 which are, in turn, mounted on stub shafts 32. The shafts are attached to frame members 34 by means of flanged collars 36. Each of the reels 28 is also provided with a groove 38 in which is wound and attached one end of spiral-like spring 40, such as the Neg'ator spring manufactured by the Hunter Spring Company of Landsdale, Pennsylvania. The other end of each spring may be attached to a stub shaft, as shown or secured to a bearing rotatably mounted on stub shaft 44 which is, in turn, atttached to frame members 34, as will be seen in Figures 3 and 6. Disks 42 are attached to the stub shafts and retain the sides of the spiral-like springs. The spiral-like springs are wound to provide a constant tension on straps 24 thereby eliminating any slack. The springs do not, however, interfere with free movement of the feet of the seat occupant in operating the controls and other movements within the confines of the cockpit. Although the crewman's feet have been illustrated in retracted position in Figure 1 for the purpose of saving space, nothing would interfere with their free movement within the cockpit as the spiral-like springs merely take the slack out of the straps and are not strong enough to pull the slippers into retracted position or maintain them there.

A second pair of reels 45 are also mounted for rotation on the stub shafts 32 in fixed spaced relation to reels 28. Each reel 28 of the first pair is provided with a short tubular member 46 mounted for conjoint rotation therewith by means of pin 48. These short tubular members have an integral lug 50, shown in Figure 4, which engages corresponding lug 52 on interlocking member 54. The interlocking member is also provided with a second lug 56 on the opposite side. Lug 56 is positioned to engage lug 58 projecting from reel 45 of the second pair upon rotational movement thereof on the stub shaft. Rotation of the reels 45 is accomplished by means of cables 60 wound thereon with opposite ends attached to the reel and arm 62 mounted for pivotal movement on torque tube 64.

The torque tube is mounted transversely in the forward part of the seat bucket 66 for rotational movement and the arms 62 are attached to the ends thereof extending rearwardly alongside the seat bucket when in the stowed position shown in Figure 1. Each arm 62 is connected to one end of link 68, the other end of which is pivotally attached to link 70. Link 70 is rigidly attached to a second torque tube 72 for pivotal movement from the position shown in Figure 1 to that of Figure 2. A crank arm 74 is attached to the second torque tube to effect rotation thereof upon extension of piston rod 76 connected thereto and mounted within thruster 78, which may conveniently be of conventional gas pressure responsive piston and cylinder type, such as that set forth and described in Patent No. 2,765,130 issued to Replogle et al. on October 2, 1956. The thruster is pivotally attached to mounting bracket 82 by means of a pin 101. The mounting bracket 82 is rigidly attached to tube 80. Actuation of the thruster is accomplished by movement of D-ring 84 which operates initiator 86 and introduces gas pressure into the lower end of the thruster through conduit 88.

The operation of the device can best be described in connection with Figures 1 and 2. The seat occupant is required to perform one simple manual operation, namely: to pull upwardly on D-ring 84. This operation fires the initiator 86, which is of a conventional gas, pyrotechnic gas or ballistically operated type such as that set forth and described in Patent No. 2,765,130, issued to Replogle et al. on October 2, 1956, and causes the piston rod 76 of thruster 78 to move from the retracted position of Figure 1 to the extended position of Figure 2 due to the gas pressure within conduit 88. Extension of the piston rod causes angular movement of crank arm 74 which rotates torque tube 72 at the rear of the seat bucket. Links 70 are thereby raised from the Figure 1 to the Figure 2 position as they are rigidly attached to the ends of torque tube 72. As link 70 is raised, lever arm 62 is moved from a stowed position extending rearwardly alongside the seat bucket to an upwardly and forwardly extending position, shown in Figure 2, by reason of link 68 interconnecting the lever arm and link 70.

In this connection it is to be noted that lever arm 62 carries a knee restraining member 90 on its free end, which is moved into position alongside the knees of the seat occupant to prevent spreading of the legs under the impact of the slip-stream as the seat occupant leaves the cockpit. Also, although the initiator and thruster have been shown as operating only the leg retraction device of the present invention for the sake of clarity and simplicity, it is to be understood that in actual practice the actuator may supply the motive force needed to carry out many other emergency escape operations; such as: jettisoning of the canopy, the ejection of the seat and pilot, and the operation of other safety devices which are required to protect the crewman. In like manner, movements of the various elements of the leg retraction device described herein can be used to carry out or initiate other operations in the emergency escape sequence.

As links 68 and 70 move from the folded position of Figure 1 to the extended position of Figure 2, they overrun the straight-line position until stop 92 on link 70 engages link 68, thus maintaining the extended position and preventing return of the links to the folded position. Upward and forward pivotal movement of lever arms 62 pulls cables 60 and rotates reels 45, of the second pair of reels, on stub shafts 32. Rotational movement of reels 45 will cause lugs 58 thereon to pick up and engage corresponding lugs 56 of the interlocking members 54 and cause them to rotate; whereupon, lugs 52 of the interlocking members will engage lugs 50 of the short tubular members 46 which are attached to reel 28, of the first pair of reels, for conjoint rotation. Rotation of reels 28 on the stub shaft 32 winds up straps 24 and pulls the slippers 10 containing the feet of the seat occupant rearward onto foot rests 94. It is to be noted that each foot rest is provided with side plates 96 and 97 which retain the feet of the seat occupant against transverse movement relative thereto.

One of the most important features of the leg retraction device of the present invention is the forwardly inclined surface 98, Figures 1 and 2, against which the ankles of the seat occupant are retracted. This inclined surface, inclined from the vertical, upwardly and away from the rear of the seat, is preferably provided with a shock-absorbent cushion 100 on its face. When the feet of the seat occupant are forcibly retracted onto the foot rests, the ankles will be pulled rearwardly against the cushion and inclined face, as shown in Figure 2. Thus restrained, the seat occupant cannot move his feet forwardly because of the position of his boots in the toe-receiving pocket 12 of the slipper 10. Transverse movement is prevented by side plates 96 and 97. The inclined face 98 prevents upward movement of the feet as said face engages the foot at approximately the ankle joint and the heel of the foot normally slopes rearwardly from the ankle joint along the inclined surface. The only way the seat occupant can free his feet from the slippers once they have been forcibly retracted by operation of the instant device is to roll forward out of the seat. This movement can only take place after the lap belt (not shown) has opened. The lap belt normally opens automatically about two seconds after ejection of the seat and occupant from the aircraft so that the crewman can separate from the ejection seat. Once the lap belt has opened, however, it is a simple matter for the seat occupant to roll forward out of the seat and disengage his feet from the slippers which are no longer needed, since the seat has a relatively lower mass to drag ratio than the body of occupant, and pulls away from the occupant. At the same time the drag imparts a relative rotation between the seat and its occupant, causing occupant to be rolled forward out of the seat without any act on the part of the occupant.

The shock of forcibly retracting the seat occupant's feet against the inclined surface 98 is absorbed by the cushion and also by stretching the rubber slippers. This design enables the retraction device to be used for substantially any size feet and permits the straps 24 to be adjusted to insure that the ankles will be tightly held against the inclined surface. Several different sizes of slippers will provide for accommodating the various foot sizes and still provide the necessary stretch for retraction.

Figure 3:
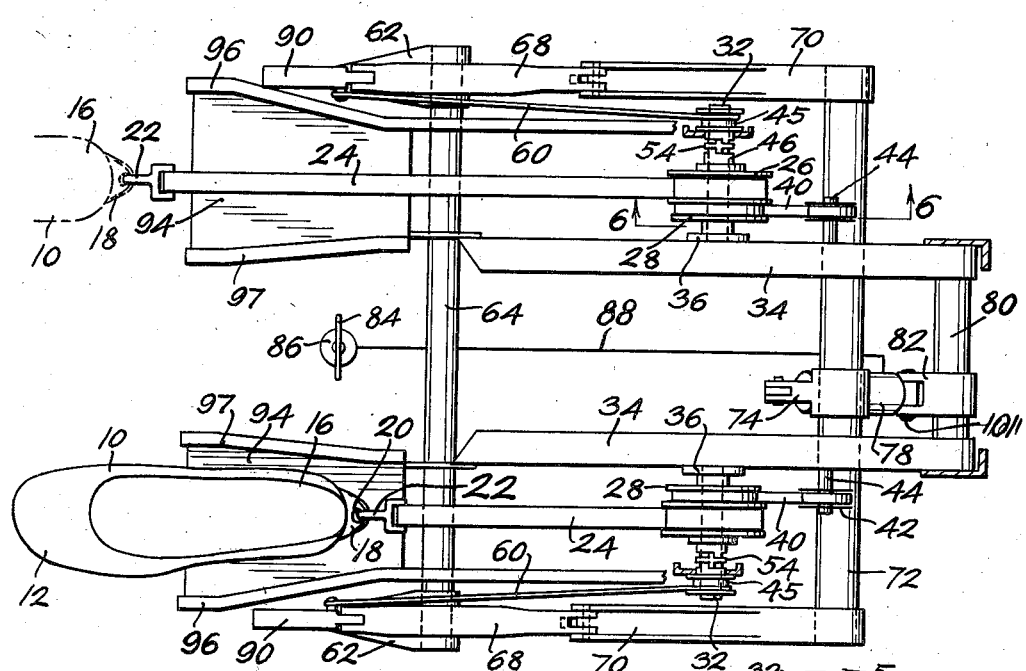
Figure 3 is a top plan view of the operating mechanism for the leg retraction device.
Figure 4:
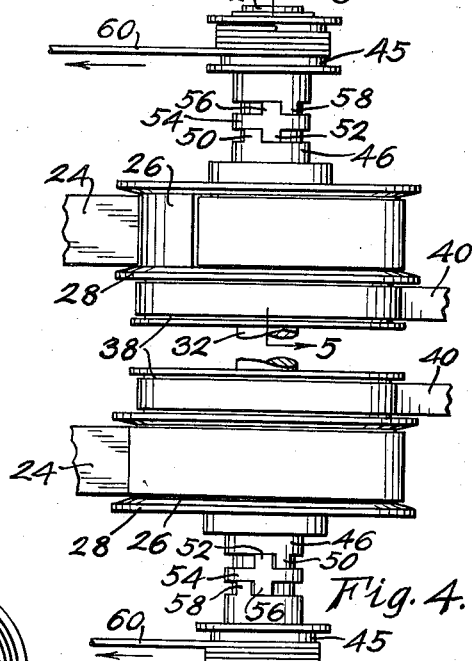
Figure 4 is an enlarged fragmentary view, portions of which have been broken away to conserve space, illustrating the reel construction.

One other important feature will now be described in connection with Figures 3 and 4 of the drawing. The seat occupant will not always have both feet, or even one foot, in fully extended position in front of him; and therefore, if the reels 28, of the first pair of reels, both began to take in the straps 24 simultaneously regardless of the position of the feet, the slippers would not reach the retracted position at the same time perhaps causing injury to the occupant. This problem has been solved through the use of a lost-motion connection between adjacent reels 45 and 28 of the first and second pair of reels respectively. The strap at the top of Figures 3 and 4 is fully extended and any rotational movement of reel 45 will be immediately transmitted to reel 28 through lugs 58, 52 and 50, thus causing the slippers to move rearwardly on to the foot rest. The bottom strap of Figures 3 and 4, however, is not fully extended and will not be taken in on reel 28 until the slipper on the top strap reaches the same transverse position; whereupon, both slippers will move against the inclined surface at the same time and at the same speed. This results from the fact that as the foot is moved rearwardly from the fully extended position, the helical spring 40 causes reel 28 to rotate and moves lug 50 away from corresponding lug 52 of the interlocking member. Further rearward movement causes lug 50 to engage lug 52 on the opposite side and thereby rotate the interlocking member so that lug 56 moves away from lug 58 of reel 45. This is the position of the strap, lugs and reels shown at the bottom of Figures 3 and 4. Therefore, upon actuation of the leg retraction device, reel 45, of the second pair of reels, will begin to rotate immediately but must make one revolution before lug 58 will engage lug 56 of the interlocking member and start it rotating. The interlocking member must then make a complete revolution before lug 52 will engage lug 50 and start the reel 28, of the first pair of reels, rotating to take in the strap. As soon as the lower reel 28, of Figures 3 and 4, begins to rotate, the slippers on both straps will be aligned transversely and move rearwardly together.

Although the leg retraction device of the present invention has been described in connection with the specific construction illustrated in the accompanying drawings, it will be apparent to one skilled in the art that many other specific constructions could be substituted for the one shown without departing from the teaching thereof; and therefore, it is intended that the invention be defined in terms of the scope of the appended claims.

Having thus described the many useful and novel features to be found in the leg retraction device of the present invention, it will be seen that the many useful objects for which it was designed have been achieved, and therefore;

I claim:

1. In combination: an ejection seat adapted to be ejected from an aircraft; a pair of slippers adapted to receive the feet of an occupant of the ejection seat; a first pair of reels carried by the ejection seat for rotational movement; a pair of straps interconnecting the slippers and the first pair of reels to effect movement of said slippers from an extended position in front of the seat to a retracted position against said seat upon rotation of said reels; tension means operatively connected to each reel of said first pair of reels to effect rotation thereof and remove slack from the straps; a second pair of reels mounted on the ejection seat for rotational movement and positioned with respect to said first pair of reels so that each reel of said second pair of reels is located adjacent to and in spaced axial alignment with one of the pair of the first pair of reels; interlocking means forming a lost-motion connection positioned between each reel of the first and second pairs of reels respectively, said interlocking means acting to permit rotation of an adjacent reel of the first pair under the influence of the tension means independent of an adjacent reel of the second pair, and said interlocking means operating to connect the adjacent reels of the first and second pairs for conjoint rotation to retract the slippers upon rotation of said adjacent reel of the second pair of reels; operating means operatively connected to the second pair of reels for effecting rotation thereof; and, manually triggered control means coupled with the operating means to effect actuation thereof whereby the slippers will be retracted against the seat to place the feet of the seat occupant in a safe position for ejection.

2. In combination: an ejection seat adapted to be jettisoned from an aircraft; a knee restraining device to prevent spreading of the knees of an occupant of the ejection seat upon ejection thereof into the slipstream, said device comprising, a pair of arms mounted on opposite sides of the ejection seat for pivotal movement and adapted on actuation to move into a position alongside the knees of the seat occupant, arm operating means carried by the ejection seat and operatively coupled with the arms to effect pivotal movement thereof on being actuated, and manually triggered control means operatively coupled with the arm operating means to effect operative actuation thereof; and, a leg retracting and restraining device to position the feet of the seat occupant against said seat in safe position for ejection from the aircraft, said device comprising, a pair of slippers adapted to receive the feet of the seat occupant, reel means mounted on opposite sides of the ejection seat for rotational movement and operatively coupled with said arms of the knee restraining device for rotational movement upon pivotal movement of said knee restraining device and connecting means operatively interconnecting the reel means and the slippers to effect movement of said slippers from an extended position in front of the ejection seat to a retracted position against said seat upon pivotal movement of said knee restraining device and resulting rotational movement of said reel means.

3. In combination: an ejection seat adapted to be ejected from an aircraft, the front of said seat having a forwardly inclined portion inclined from the vertical, upwardly and away from the rear of the seat; a pair of slippers formed of elastic material and adapted to receive the feet of an occupant of the seat; a first pair of reels carried by the seat for rotational movement; a pair of straps interconnecting the slippers and first pair of reels to effect movement of said slippers from an extended position in front of the seat to a retracted position against the forwardly inclined portion of said seat upon rotation of the reels; spring means connected to the first pair of reels to maintain a constant tension on the straps; a second pair of reels carried by the seat for rotational movement and positioned such that each reel of said second pair lies in spaced axial alignment to one of the reels of the first pair; an interlocking member mounted for rotation between the adjacent reels of the first and second pairs and provided with means adapted to engage a portion of each said adjacent reels to effect joint rotation therewith, said interlocking means forming a lost-motion connection which permits a reel of the first pair to rotate under the influence of the spring means without causing the adjacent reel of the second pair to rotate during limited extension and retraction of the slippers relative to the seat, and said interlocking means acting to interconnect adjacent reels of the first and second pairs for conjoint rotational movement to retract the slippers against the forwardly inclined portion of the seat upon continued rotation of the reel of the second pair; a pair of lever arms mounted on opposite sides of the seat for pivotal movement and adapted to be moved into position alongside the knees of the seat occupant to prevent spreading thereof under the force of the slipstream after ejection of the seat; cable means operatively interconnecting the lever arms and the second pair of reels to effect rotation of said reels upon pivotal movement of said lever arms; a gas pressure responsive device operatively coupled with the lever arms to effect pivotal movement thereof in response to a generated gas pressure; a pyrotechnic gas generator operatively coupled with the gas pressure responsive device adapted to generate a gas pressure on actuation to effect operation thereof; and a manually triggered control device operatively coupled to said gas generator to actuate the gas generator on command thereby causing the feet of the seat occupant to be retracted against the forwardly inclined portion of the seat and the lever arms to be positioned alongside the knees of said occupant prior to ejection from the aircraft.

4. In combination: an aircraft ejection seat adapted to be jettisoned from within an aircraft fuselage; slippers provided with toe pockets adapted to receive and engage the feet and toes of an occupant of the ejection seat for quick release; reel means carried by the ejection seat and operatively conected to the slippers for effecting retracting movement thereof; tension means supported by said seat and operatively connected to said reel means to continuously bias said reel means toward retracting position with substantially constant force; retraction means supported by said seat and operatively connected to said reel means to selectively effect retraction of said slippers from an extended position in front of the seat to a retracted position against the seat; and, a manually triggered control operatively connected to said retraction means to effect actuation thereof and retract the slippers and feet of a seat occupant, when received thereby, to a safe position for ejection from an aircraft, said slippers being of a construction to permit the feet of an occupant of the seat to slip out of the slippers after ejection of the seat.

5. In combination: an aircraft ejection seat adapted to be jettisoned from within an aircraft fuselage; slippers provided with toe pockets adapted to receive and engage the feet and toes of an occupant of the ejection seat for quick release; first reel means carried by the ejection seat for rotational movement, strap means interconnecting the slippers with said first reel means to effect movement of said slippers from an extended position in front of the seat to a retracted position adjacent the seat upon rotation of said first reel means, tension means supported by said seat and operatively connected to said first reel means to continuously bias said first reel means toward retracting position with substantially constant force, second reel means carried by the ejection seat for rotational movement, a lost motion interconnection between said second reel means and said first reel means to permit rotation of said first reel means under the influence of said tension means independent of said second reel means, said interconnection providing a positive connection between said second reel means and said first reel means upon rotation of said second reel means, operating means supported by said seat and operatively connected to said second reel means for effecting rotation thereof, and manually triggered control means coupled with the operating means to effect actuation thereof whereby the slippers will be retracted to place the feet of the seat occupant in a safe position for ejection.

6. In combination: an aircraft ejection seat adapted to be jettisoned through an opening in an aircraft fuselage, a foot rest supported at the lower forward portion of the seat, an inclined portion supported by said seat adjacent said foot rest and disposed at an acute angle thereto, a pair of slippers having toe pockets adapted to receive the feet of an occupant of the ejection seat, reel means carried by the ejection seat for rotational movement; strap means interconnecting the slippers and the reel means to effect movement thereof from an extended position in front of the ejection seat to a retracted position upon rotation of said reel means, said strap means being disposed below said inclined portion whereby upon retracting movement of said slippers, the slippers are supported upon said foot rest and the ankles of the seat occupant are pulled rearwardly against said inclined portion thereby preventing upward movement of the feet of the seat occupant but permitting the said occupant to free his feet from the slippers by rolling forwardly out of the seat; gas pressure responsive means operatively connected to the reel means to effect rotation thereof; a pyrotechnic gas pressure generator connected to the gas pressure responsive means to effect rotation thereof; and a manually operable control interconnecting the pyrotechnic gas generator and the gas pressure responsive means.

7. In combination: an aircraft ejection seat adapted to be jettisoned through an opening in air aircraft fuselage, a foot rest supported at the lower forward portion of the seat, an inclined portion supported by said seat adjacent said foot rest and disposed at an acute angle thereto, a pair of slippers having toe pockets adapted to receive the feet of an occupant of the ejection seat, reel means carried by the ejection seat for rotational movement; strap means interconnecting the slippers and the reel means to effect movement thereof from an extended position in front of the ejection seat to a retracted position upon rotation of said reel means; tension means operatively connected to said reel means to continuously bias said reel means toward retracting position with substantially constant force to remove slack from said strap means at all times, said strap means being disposed below said inclined portion whereby upon retracting movement of said slippers, the slippers are supported upon said foot rest and the ankles of the seat occupant are pulled rearwardly against said inclined portion thereby preventing upward movement of the feet of the seat occupant but permitting the said occupant to free his feet from the slippers by rolling forwardly out of the seat; gas pressure responsive means operatively connected to the reel means to effect rotation thereof; a pyrotechnic gas pressure generator connected to the gas pressure responsive means to effect rotation thereof; and a manually operable control interconnecting the pyrotechnic gas generator and the gas pressure responsive means.

References Cited in the file of this patent

UNITED STATES PATENTS

| 2,528,532 | Martin | Nov. 7, 1950 |
| 2,733,027 | Gero | Jan. 31, 1956 |
| 2,765,130 | Replogle et al. | Oct. 2, 1956 |